US012617433B2

(12) United States Patent
Jeon et al.

(10) Patent No.: US 12,617,433 B2
(45) Date of Patent: May 5, 2026

(54) ALGORITHM OPERATION MANAGEMENT APPARATUS AND METHOD

(71) Applicant: HYUNDAI MOBIS CO., LTD., Seoul (KR)

(72) Inventors: Byeong Hwan Jeon, Yongin-si (KR); Young Hun Na, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 79 days.

(21) Appl. No.: 18/677,166

(22) Filed: May 29, 2024

(65) Prior Publication Data

US 2025/0100582 A1 Mar. 27, 2025

(30) Foreign Application Priority Data

Sep. 22, 2023 (KR) ........................ 10-2023-0127203

(51) Int. Cl.
*B60W 60/00* (2020.01)
*G06N 20/00* (2019.01)

(52) U.S. Cl.
CPC ......... *B60W 60/0015* (2020.02); *G06N 20/00* (2019.01)

(58) Field of Classification Search
CPC ......... B60W 60/0015; B60W 50/0098; B60W 30/02; B60W 40/02; B60W 2050/0004; B60W 2420/403; B60W 2420/408; G06N 20/00; G06N 3/088
See application file for complete search history.

(56) References Cited

U.S. PATENT DOCUMENTS

| | | | |
|---|---|---|---|
| 9,187,088 B1 * | 11/2015 | Ferguson | ............... G06N 20/00 |
| 9,934,688 B2 * | 4/2018 | Olson | .................... B60W 40/10 |
| 10,126,136 B2 * | 11/2018 | Iagnemma | ............. G01C 21/34 |
| 2021/0339772 A1 * | 11/2021 | Ramamoorthy | .. B60W 60/0015 |

* cited by examiner

*Primary Examiner* — Masud Ahmed
(74) *Attorney, Agent, or Firm* — MORGAN, LEWIS & BOCKIUS LLP

(57) ABSTRACT

Disclosed herein is an algorithm operation management apparatus and method, in which the algorithm operation management apparatus includes a learning part configured to learn by classifying an accident situation and a safety situation for each driving condition; a determination part configured to adjust an operating parameter for at least one algorithm related to driving control of a vehicle on the basis of a determination result of the learning part; and an operation part configured to perform the driving control of the vehicle by applying the adjusted operating parameter on the basis of the at least one algorithm.

10 Claims, 5 Drawing Sheets learning part ~*300* determination part ~*100* operation part ~*200*

FIG. 2 algorithm operation information acquisition part — 110 vehicle information acquisition part driving location information external environment information vehicle status information driving situation information — 120 operation part — 200 algorithm control determination part — 130

100 artificial intelligence learning model — 330 secondary data storage — 340 primary data storage — 320 accident and safety information for vehicle location accident and safety information for external environment accident and safety information for vehicle status accident and safety information for driving situation

300 accident and safety information acquisition part — 310 accident and safety information acquisition unit for vehicle location accident and safety information acquisition unit for external environment accident and safety information acquisition unit for internal environment accident and safety information acquisition unit for driving status

FIG. 3 start acquire vehicle information — *S310* is information changed? *S320*

Figure 3:
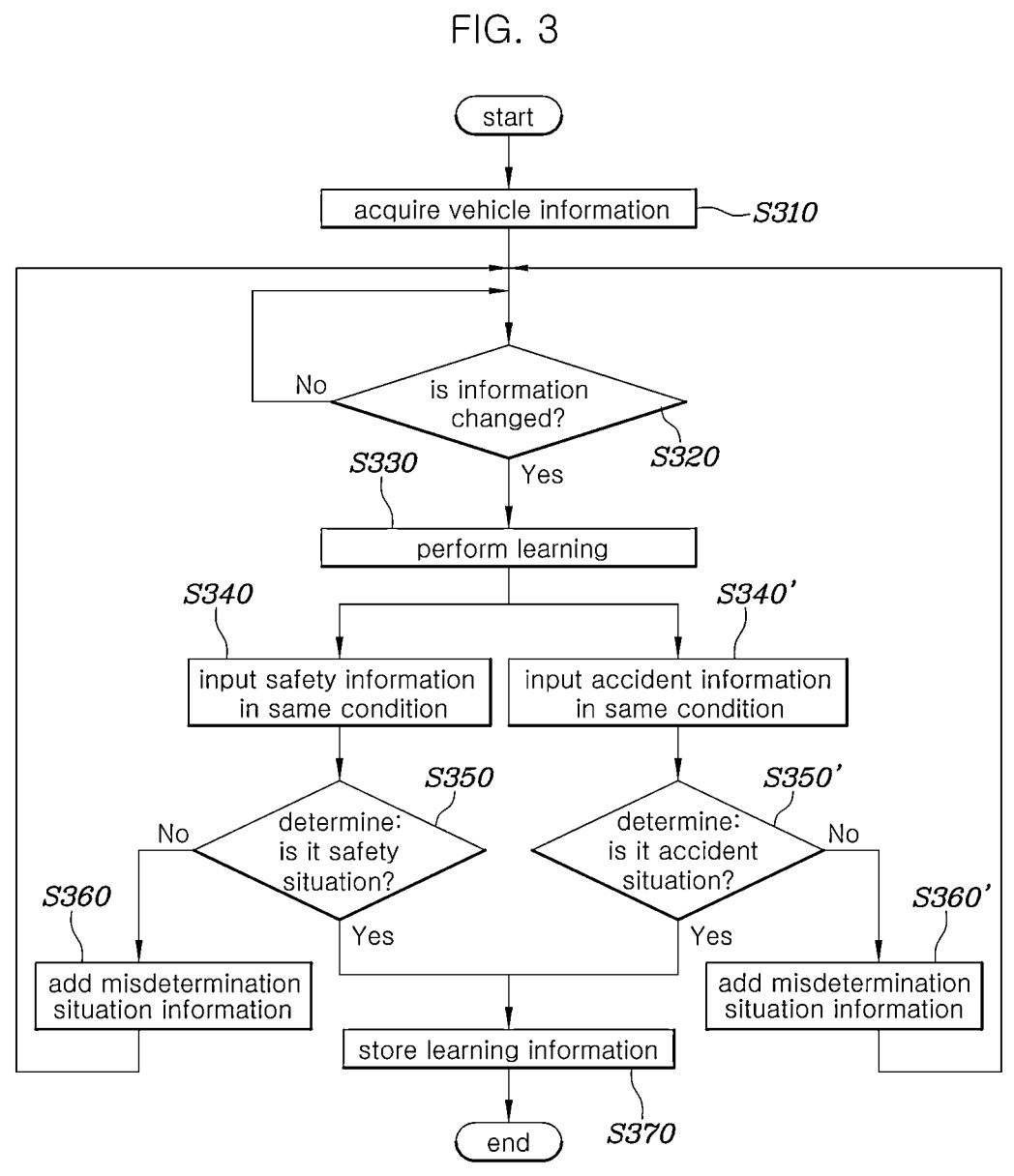

No *S330*

Yes perform learning

*S340* input safety information in same condition

*S340'* input accident information in same condition determine: is it safety situation? *S350* determine: is it accident situation? *S350'*

No

Yes

Yes

No

*S360* add misdetermination situation information

*S360'* add misdetermination situation information store learning information end  *S370*

FIG. 5
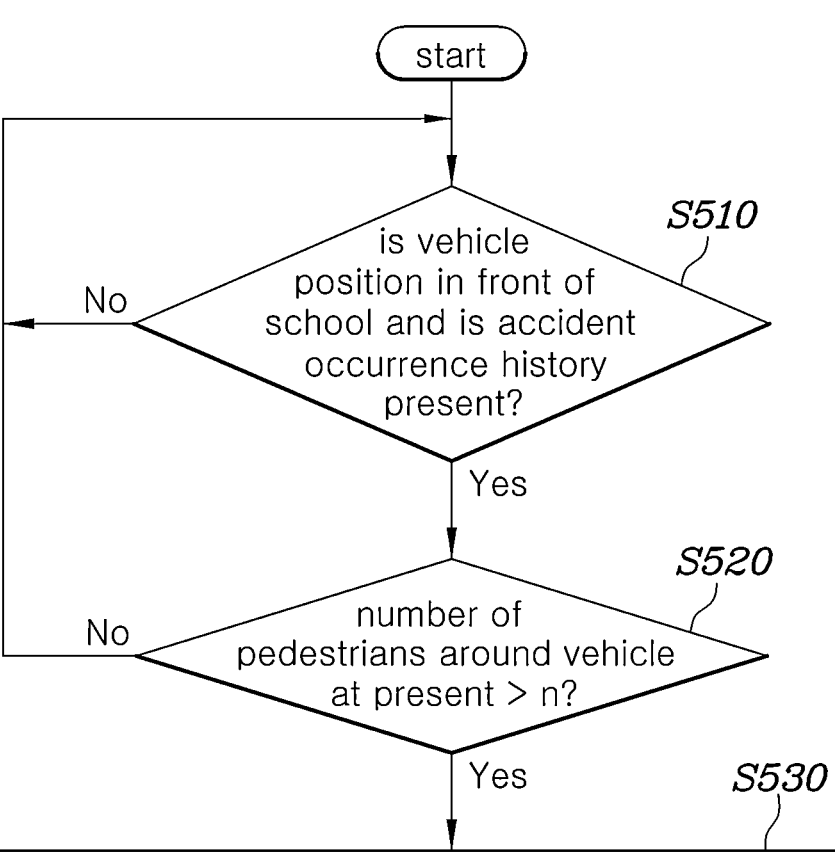
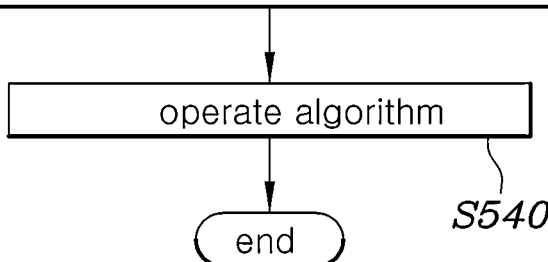

ALGORITHM OPERATION MANAGEMENT APPARATUS AND METHOD

CROSS REFERENCE TO RELATED APPLICATION

The present application claims priority of Korean Patent Application No. 10-2023-0127203 filed on Sep. 22, 2023, the entire contents of which is incorporated herein for all purposes by this reference.

BACKGROUND OF THE DISCLOSURE

Field of the Disclosure

The present disclosure relates to an algorithm operation management apparatus and method that allows algorithms used to assist vehicle driving to have optimal reliability and performance.

Description of the Related Art

Recently, among vehicle-related technologies, there is a growing interest on autonomous driving vehicles with unmanned driving functions that drive automatically without driver intervention.

In autonomous driving vehicles, information necessary for driving, such as a shape of a road and obstacles, can be identified by analyzing data obtained through various sensors such as satellite navigation devices, inertial navigation devices, radio detecting and ranging (RADAR), ultrasonic measuring devices, laser scanners, and cameras, which are mounted in the vehicles.

In addition, in autonomous driving vehicles, driving control can be performed, such as avoiding obstacles, by controlling a steering and a speed of the vehicle according to the information such as the identified road shape and obstacles.

Various algorithms can be applied to such autonomous driving vehicles to acquire information necessary for driving and perform driving control. In such autonomous driving vehicles, scheduling between algorithms can be performed according to priorities set between the algorithms and performance of the algorithms.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to provide an algorithm operation management apparatus and method that allows algorithms for vehicle driving to have optimal performance and reliability by adjusting operating parameters of the algorithms through learning results for a plurality of driving conditions.

It should be noted that objects of the present disclosure are not limited to the above-described objects, and other objects of the present disclosure will be apparent to those skilled in the art from the following descriptions.

According to one aspect, there is provided an algorithm operation management apparatus including: a learning part configured to learn by classifying an accident situation and a safety situation according to a plurality of driving conditions; a determination part configured to adjust an operating parameter for at least one algorithm related to driving control of a vehicle on the basis of a determination result of the learning part according to a current driving condition; and an operation part configured to perform the driving control of the vehicle by applying the adjusted operating parameter on the basis of the at least one algorithm.

As one example, when the determination result of the learning part corresponds to the accident situation, the determination part may adjust the operating parameter to increase or decrease operation performance of at least one algorithm related to the accident situation.

As one example, the determination part may adjust an operating parameter for at least one of the remaining algorithms of the at least one algorithm according to adjustment of an operating parameter for any one of the at least one algorithm.

As one example, the operating parameter may include at least one among a processor occupation time, an occupied resource, an operating cycle, a processing resolution, a complexity level of the at least one algorithm and an operation priority between the at least one algorithm.

As one example, the plurality of driving conditions may be determined on the basis of vehicle information for a vehicle location, an external environment, an internal environment, and a driving status.

As one example, the at least one algorithm may include at least one among a driving lane detection algorithm, a surrounding object detection algorithm, a parking line detection algorithm, a surrounding vehicle detection algorithm, and a space detection algorithm.

As one example, in a state before the operating parameter for the at least one algorithm is set, the determination part may set the operating parameter for the at least one algorithm on the basis of the current driving condition and the determination result of the learning part.

As one example, the learning part may perform the learning by receiving information corresponding to an accident situation and a safety situation in the same driving condition.

As one example, the learning part may derive the determination result on the basis of a verification result of the learning result.

According to one aspect, there is provided an algorithm operation management method including learning, by a learning part, by classifying an accident situation and a safety situation according to a plurality of driving conditions; adjusting, by a determination part, an operating parameter for at least one algorithm related to driving control of a vehicle on the basis of a determination result of the learning part according to a current driving condition; and performing, by an operation part, the driving control of the vehicle by applying the adjusted operating parameter on the basis of the at least one algorithm.

BRIEF DESCRIPTION OF THE DRAWINGS

The accompanying drawings are intended to aid understanding of embodiments of the present disclosure and provide embodiments along with detailed descriptions. However, the technical features of these embodiments are not limited to specific drawings, and the features disclosed in each drawing may be combined to form a new embodiment, in which:

FIG. 2 is a diagram for describing an example of implementation of the algorithm operation management apparatus that can be applied to embodiments of the present disclosure;

FIG. 3 is a flowchart for describing a learning process performed by a learning part of the algorithm operation management apparatus according to one embodiment of the present disclosure;

FIG. 5 is a diagram for describing an example in which an operating parameter of an algorithm according to one embodiment of the present disclosure is adjusted.

DETAILED DESCRIPTION OF THE DISCLOSURE

Figure 1:
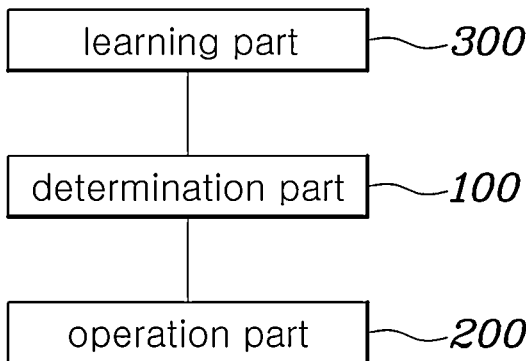
FIG. 1 is a diagram illustrating a configuration of an algorithm operation management apparatus according to one embodiment of the present disclosure.

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in the present specification or application.

The embodiments according to the present disclosure may be variously modified and may have various forms, so that specific embodiments will be illustrated in the drawings and be described in detail in the present specification or application. It should be understood, however, that it is not intended to limit the embodiments according to the concept of the present disclosure to specific disclosure forms, but it includes all modifications, equivalents, and alternatives falling within the spirit and scope of the present disclosure.

Unless defined otherwise, all terms including technical or scientific terms used herein have the same meaning as commonly understood by those skill in the art to which the present disclosure pertains. General terms that are defined in a dictionary shall be construed to have meanings that are consistent in the context of the relevant art and will not be interpreted as having an idealistic or excessively formalistic meaning unless clearly defined in the present specification.

Hereinafter, embodiments disclosed in the present specification will be described in detail with reference to the drawings. The same reference numerals are given to the same or similar components regardless of reference numerals, and a repetitive description thereof will be omitted.

In the description of the following embodiments, the term "preset" means that a value of a parameter is predetermined when using the parameter in a process or algorithm. Depending on the embodiment, the value of the parameter may be set when a process or algorithm starts or may be set during a section in which the process or algorithm is performed.

As used in the following description, suffixes "module" and "part" for a component are used or interchangeably used solely for ease of preparation of the specification, and do not have different meanings and each of them does not function by itself.

In describing embodiments disclosed in the present specification, when a detailed description of a known related art is determined to obscure the gist of the present specification, the detailed description thereof will be omitted herein. In addition, the accompanying drawings are merely for easy understanding of the embodiments disclosed in the present specification, the technical spirit disclosed in the present specification is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for the purpose of distinguishing one component from another component.

When a component is referred to as being "connected" or "coupled" to another component, the component may be directly connected or coupled to another component, but it should be understood that sill another component may be present between the component and another component. Conversely, when a component is referred to as being "directly connected" or "directly coupled" to another, it should be understood that still another component may not be present between the component and another component.

Unless the context clearly dictates otherwise, the singular form includes the plural form.

In the present specification, the terms "comprising," "having," or the like are used to specify that a feature, a number, a step, an operation, a component, an element, or a combination thereof described herein exists, and they do not preclude the presence or addition probability of one or more other features, numbers, steps, operations, components, elements, or combinations thereof.

An algorithm operation management apparatus according to one embodiment of the present disclosure adjusts operating parameters of an algorithm mounted in a vehicle on the basis of pieces of information related to a driving of the vehicle and information learned based thereon, and thus, proposes to allow the algorithm mounted in the vehicle to have optimal performance and reliability. Hereinafter, a configuration of the algorithm operation management apparatus according to one embodiment of the present disclosure will be described first with reference to FIG. 1.

FIG. 1 is a diagram illustrating a configuration of an algorithm operation management apparatus according to one embodiment of the present disclosure.

Referring to FIG. 1, the algorithm operation management apparatus according to one embodiment of the present disclosure may include a determination part 100, an operation part 200, and a learning part 300. Meanwhile, FIG. 1 mainly shows components related to the description of one embodiment of the present disclosure, and of course, an actual algorithm operation management apparatus may be implemented including more or fewer components. Hereinafter, each component will be described in detail.

First, the determination part 100 may adjust operating parameters for at least one algorithm related to driving control of a vehicle on the basis of a determination result of the learning part 300 according to a current driving condition.

Here, the at least one algorithm may include a driving lane detection algorithm, a surrounding object detection algorithm, a parking line detection algorithm, a surrounding vehicle detection algorithm, and a space detection algorithm.

The driving lane detection algorithm, for example, allows driving control to be performed to recognize lanes around the vehicle and identify a lane in which the vehicle is driving, and thus to prevent the vehicle from leaving the lane in which the vehicle is driving or to change the lane stably.

The surrounding object detection algorithm, for example, allows driving control to be performed to detect objects such as pedestrians and obstacles, excluding vehicles located around an own vehicle, and thus to provide a detour route or slow down/stop the vehicle.

The parking line detection algorithm, for example, allows driving control to be performed to detect parking lines around the vehicle or provide a path for the vehicle to reach an area within the parking line, and thus to move the vehicle.

The surrounding vehicle detection algorithm, for example, allows driving control to be performed to detect a location, a speed, and a driving direction of other vehicles located around the own vehicle, and thus provide a driving path to which a possibility of collision is reflected, determine whether a lane change is possible, and perform steering/ vehicle speed control.

The space detection algorithm, for example, allows driving control to be performed to detect characteristics of a space around the vehicle, and thus determine a possible driving range through the detected characteristics.

Meanwhile, the operating parameters for the algorithm relate to a state in which the operation of the algorithm, such as calculation, processing, judgment, determination, and storage, is performed and may be particularly related to operation performance of the algorithm.

For example, the operating parameters for the algorithm may include at least one among a processor occupation time, an occupied resource, an operating cycle, a processing resolution, a complexity level, and an operation priority between algorithms. In addition, when a plurality of algorithms are present, the operating parameters may be for each algorithm or may refer to operating parameters for all the plurality of algorithms.

The determination part 100 may set operating parameters for at least one algorithm on the basis of a learning result of the learning part 300 according to a plurality of driving conditions and adjust the set operating parameters again on the basis of a learning result according to a current driving condition, and the operation part 200 may operate the algorithm according to the operating parameters which are set or adjusted through the determination part 100.

In particular, when the determination result of the learning part corresponds to an accident situation, the determination part 100 may adjust the operating parameters to increase or decrease operation performance of at least one algorithm related to the accident situation. For example, the determination part 100 may increase operation performance of a specific algorithm by adjusting the operating parameters, such as increasing a processor occupation time of the specific algorithm or shortening an operating cycle and may decrease the operation performance of the specific algorithm by adjusting the operating parameters, such as decreasing a processing resolution or an operation priority.

In one embodiment, the adjustment of the operating parameters for one algorithm may affect operating parameters of another algorithm. In particular, the determination part 100 may adjust the operating parameters of at least one among the remaining algorithms according to the adjustment of the operating parameters of any one among the one or more algorithms.

For example, when the determination part 100 performs an operating parameter adjustment that increases a processor occupation time for one algorithm, the determination part 100 may perform an operating parameter adjustment that decrease a processor occupation time for another algorithm.

Through the adjustment of the algorithm operating parameters of the determination part 100, the operation performance of the algorithm not requiring relatively high performance in the current situation is decreased so that the algorithm may be operated with optimal efficiency within a limited usable range according to the driving situation by securing improvement of the operation performance of the algorithm requiring relatively high performance.

A driving condition for the above-described adjustment of the operating parameters may be determined by pieces of vehicle information related to the driving control of the vehicle. In particular, the vehicle information may include accident information corresponding to an accident situation of the vehicle and safety information corresponding to a safety situation. In addition, the vehicle information may be classified into at least one among a vehicle location, an external environment, an internal environment, and a driving status.

For example, the vehicle information may include accident information corresponding to an accident situation for a location of the vehicle, such as a highway, a toll gate, a national highway, in front of a school, or at an intersection, and safety information corresponding to a safety situation.

For example, the vehicle information may include accident information corresponding to accident situations for an external environment of the vehicle, such as weather, surrounding objects (pedestrians and obstacles), and surrounding vehicles and safety information corresponding to safety situations.

For example, the vehicle information may include accident information corresponding to accident situations for an internal environment of the vehicle, such as the number of passengers, a vehicle weight, a fuel status, a tire wear status, and a sensor noise status and safety information corresponding to safety situations.

For example, the vehicle information may include accident information corresponding to accident situations for a driving state, such as a driving direction, a driving speed, and acceleration and safety information corresponding to safety situations.

In addition, the learning result may be derived on the basis of the above-described vehicle information. The learning part 300 may perform learning by receiving the vehicle information and derive a learning result for a driving condition according to the vehicle information. The learning part 300 may be implemented by including, for example, an artificial intelligence learning model, and the artificial intelligence learning model may include machine learning, a a neural network, deep learning, classification algorithm, or some of combinations thereof.

For example, the learning part 300 may receive the accident information corresponding to accident situations for a location, an external environment, an internal environment, and a driving status of the vehicle and the safety information corresponding to safety situations and learn determination criteria on the accident situations and the safety situations. In particular, the learning part 300 may receive and learn accident information and safety information for the same driving condition.

Furthermore, the learning part 300 may derive learning information by further reflecting a verification result of the learning result. For example, the learning part 300 may learn determination criteria for the accident situations or the safety situations and then may feedback the learned determination criteria according to whether the determination result derived by inputting the test information corresponds to the input test information.

Meanwhile, the determination part 100, the operation part 200, and the learning part 300 according to one embodiment may each include a communication device which communicates with other controllers or sensors to perform functions in charge (learning, determination, storage, and control), a memory which stores an operating system or logic command and input and output information, and one or more processors for performing determination, an arithmetic operation, and decision, which are necessary to perform the function in charge. A more specific example of implementation of the algorithm operation management apparatus according to one embodiment will be described below with reference to FIG. 2.

Figure 2:
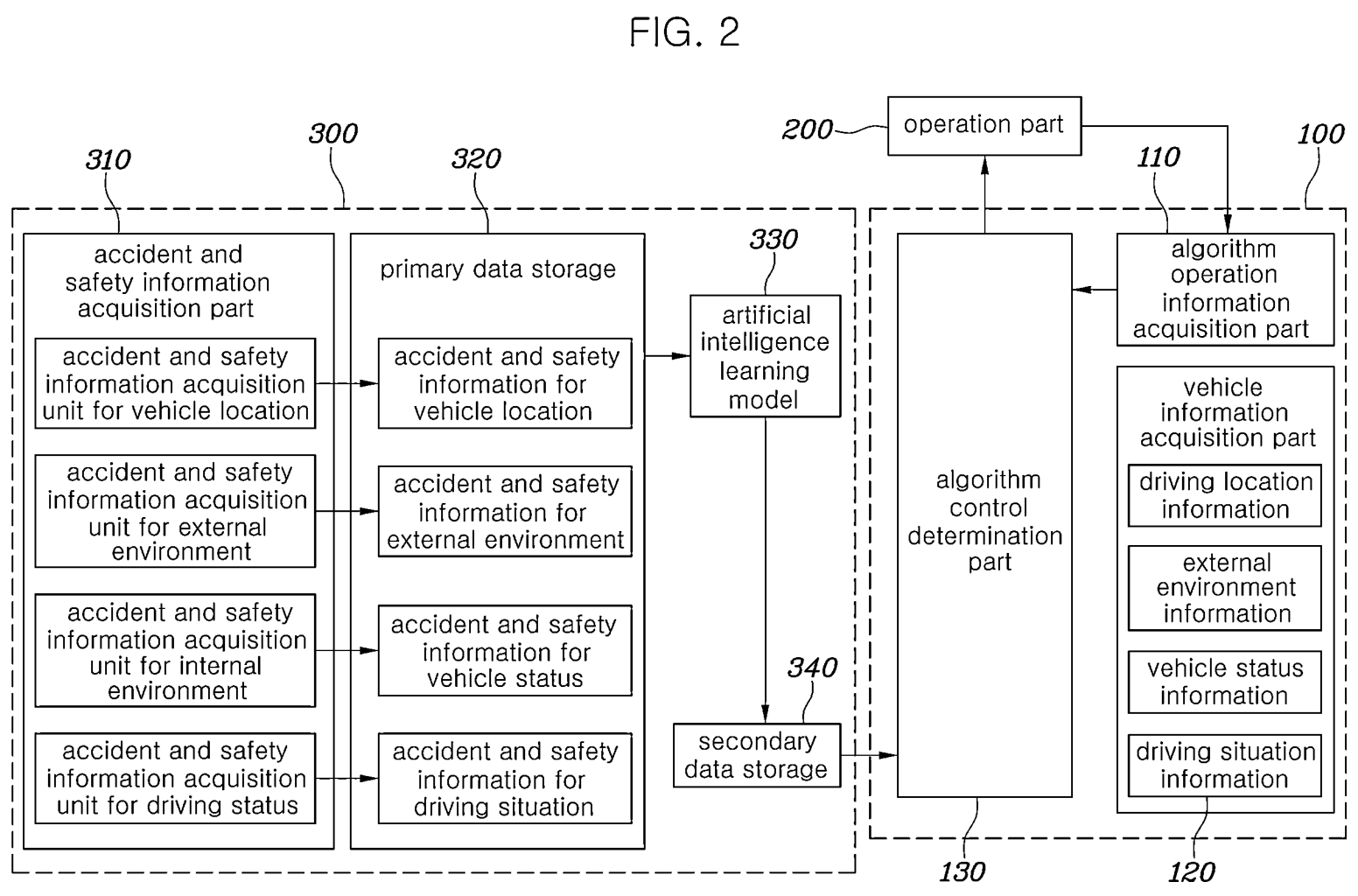

FIG. 2 is a diagram for describing an example of implementation of the algorithm operation management apparatus that can be applied to embodiments of the present disclosure.

Referring to FIG. 2, in the algorithm operation management apparatus according to one embodiment, the determination part 100 may include an algorithm operation information acquisition part 110, a vehicle information acquisition part 120, and an algorithm control determination part 130 as detailed components. The learning part 300 may include an accident and safety information acquisition part 310, a primary data storage 320, an artificial intelligence learning model 330, and a secondary data storage 340 as detailed components.

The accident and safety information acquisition part 310 of the learning part 300 may acquire accident information and safety information on a vehicle location, an external environment, an internal environment, and a driving status through various sensors and communication devices such as a camera, light detection and ranging (LiDAR), and radio detecting and ranging (RADAR), and the primary data storage 320 may store the information acquired through the accident and safety information acquisition part 310.

The information stored in the primary data storage 320 is input into the artificial intelligence learning model 330 and learned, and the information derived from the learning result is stored in the secondary data storage 340.

In this case, the artificial intelligence learning model 330 may perform learning by, for example, extracting characteristics and unique values for each driving situation from the vehicle information and deriving driving situation meta data through unsupervised learning.

The learning information stored in the secondary data storage 340 is provided to the algorithm control determination part 130 of the determination part 100. In addition to the learning information, the algorithm control determination part 130 may acquire algorithm operation information including preset operating parameters for the algorithm and vehicle information from the algorithm operation information acquisition part 110 and the vehicle information acquisition part 120, respectively.

The algorithm control determination part 130 may set operating parameters for at least one algorithm on the basis of the input vehicle information, algorithm operating information, and learning information and adjust the set operating parameters again. For example, the algorithm control determination part 130 may adjust the operating parameters of each algorithm within an available range of the entire algorithm by increasing operation performance of algorithms, which require high performance in a current situation, and decreasing operation performance of algorithms, which do not require high performance in the current situation. On the other hand, the algorithm control determination part 130 may adjust only the operating parameters of a specific algorithm without affecting the operating parameters of other algorithms. In particular, when there is a portion that is not yet allocated within the available range of the entire algorithm, the algorithm control determination part 130 may adjust operating parameters to improve the operation performance of a specific algorithm and maintain the set operating parameters for other algorithms.

The operation part 200 may receive the operating parameters set or adjusted for at least one algorithm and perform driving control of the vehicle by applying the set or adjusted operating parameters on the basis of the at least one algorithm. For example, the operation part 200 may allow the at least one algorithm to operate according to an operating cycle, a resolution, a priority, and complexity, which are set or adjusted.

The set or adjusted operating parameters and operation information on an algorithm generated during an operation process of other algorithms may be provided to the algorithm control determination part 130 through the algorithm operation information acquisition part 110 again and the above-described operating parameter adjustment process may be repeated.

Hereinafter, each process performed by the algorithm operation management apparatus will be described with reference to FIGS. 3 to 5.

FIG. 3 is a flowchart for describing a learning process performed by a learning part of the algorithm operation management apparatus according to one embodiment of the present disclosure.

Referring to FIG. 3 first, the learning part 300 may acquire vehicle information (S310), and when there is a change in the vehicle information or when the vehicle information different from previously stored vehicle information is acquired (Yes of S320), the learning part 300 may learn on the basis of the vehicle information (S330).

In addition, in order to secure reliability of a learning result, the learning part 300 may receive test information for which each determination result is set (S340 and S340') and may determine whether a determination result corresponding to the input information is derived (S350 and S350'). As the determination result, when the determination result corresponding to the input information is not derived (No of S350 and No of S350'), the learning part 300 may perform learning again by adding misdetermination situation information (S360 and S360'), and as the determination result, when the determination result corresponding to the input information is derived, the learning part 300 may consider that the reliability of the learning result is secured and store the learning information (S370).

More specifically, when a determination result, which is obtained by receiving safety information corresponding to a safety situation of a specific condition (for example, a vehicle location, a vehicle speed, and a driving direction) (S340) and determining the safety information, corresponds to an accident situation (No of S350), the learning part 300 may perform learning again by adding misdetermination situation information (S360), and when the determination result corresponds to a safety situation (Yes of S350), the learning part 300 may store the learning result as learning information. More specifically, when a determination result, which is obtained by receiving accident information corresponding to an accident situation in the same condition (S340') and determining the accident information, corresponds to a safety situation (No of S350'), the learning part 300 may perform learning again by adding the misdetermination situation information (S360'), and when the determination result corresponds to the accident situation (Yes of S350'), the learning part 300 may store the learning result as the learning information.

The learning results derived as described above may be used to set or adjust operating parameters for an algorithm, and this will be described with reference to FIG. 4.

Figure 4:
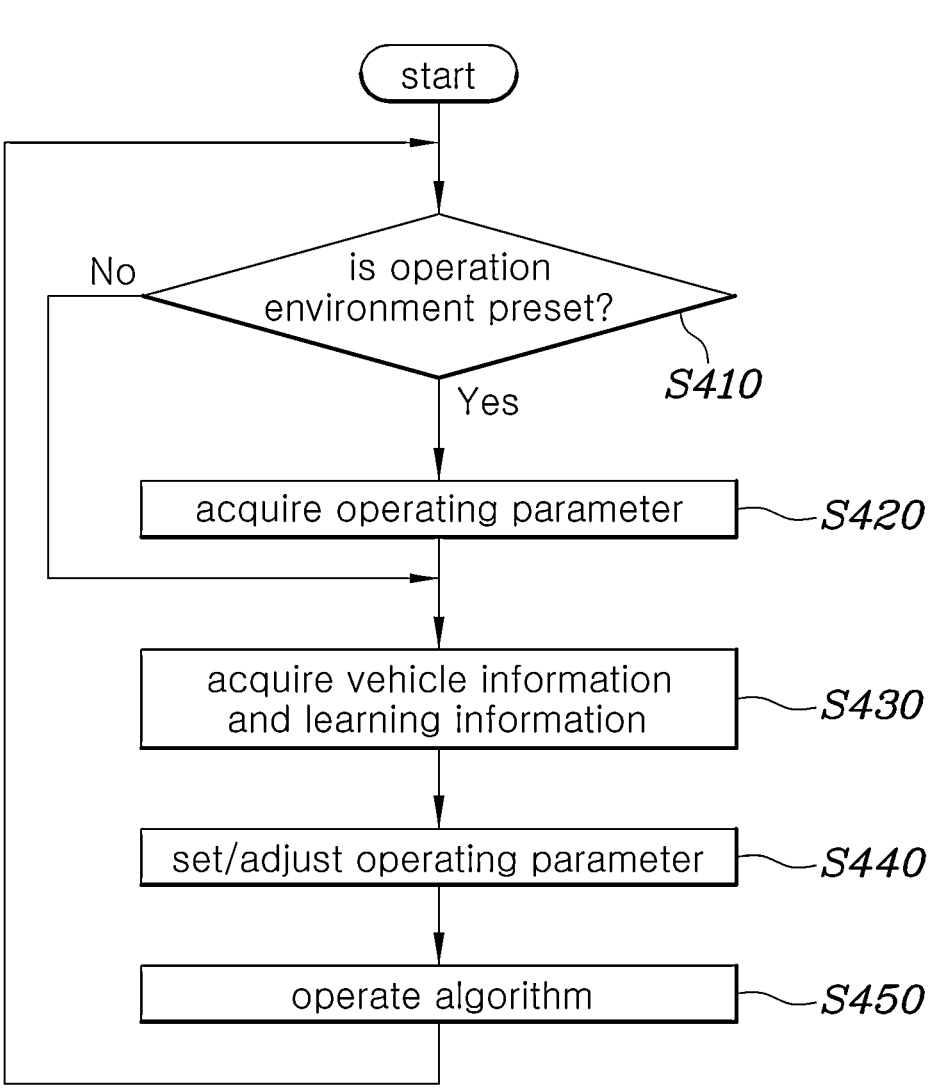
FIG. 4 is a flowchart for describing an algorithm operation management process performed by a determination part and an operation part of the algorithm operation management apparatus according to one embodiment of the present disclosure.

FIG. 4 is a flowchart for describing an algorithm operation management process performed by a determination part and an operation part of the algorithm operation management apparatus according to one embodiment of the present disclosure.

Referring to FIG. 4, when operating parameters for an algorithm are set in advance (Yes of S410), the determination part 100 may acquire set operating parameters (S420), acquire vehicle information and learning information (S430), and adjust the set operating parameters (S440). Otherwise, when the operating parameters for the algorithm are not set in advance (No of S410), the determination part 100 may set the operating parameters of the algorithm on the basis of the acquired vehicle information and learning information (S430, S440).

Thereafter, the operation part 200 may perform driving control of the vehicle by operating an algorithm on the basis of the operating parameters set or adjusted through the determination part 100 (S450).

A specific example of the above-described processes will be described below with reference to FIG. 5.

FIG. 5 is a diagram for describing an example in which an operating parameter of an algorithm according to one embodiment of the present disclosure is adjusted.

Referring to FIG. 5, the determination part 100 may determine whether a vehicle location is in front of the school and whether there is an accident occurrence history at the vehicle location on the basis of the vehicle information and the learning information (S510).

When the vehicle location is in front of the school and there is the accident occurrence history at the vehicle location (Yes of S510), the determination part 100 may determine whether the number of pedestrians around the vehicle at present exceeds n on the basis of the vehicle information (S520) and, when the number of pedestrians exceeds n (Yes of S520), in order to strengthen a collision prevention function, the determination part 100 may adjust the operating parameters to improve operation performance of a surrounding object detection algorithm (S530).

More specifically, the determination part 100 may increase a frame per second (FPS) of the surrounding object detection algorithm from 30 FPS to 60 FPS to reduce an operating cycle or change a processing resolution from HD to FHD, thereby improving operation performance of the surrounding object detection algorithm. In addition, the determination part 100 may increase complexity of the surrounding object detection algorithm by changing a priority level from Normal to High in relation to other algorithms or changing the priority level to a high priority level or changing a window size from 32*32 to 16*16.

The operation part 200 operates the surrounding object detection algorithm on the basis of the operating parameters adjusted as described above (S540), and thus the surrounding object detection algorithm may operate with improved performance. In this way, as the performance of the surrounding object detection algorithm is improved, the vehicle driving may be controlled with optimal efficiency in a current situation in which collision avoidance with surrounding pedestrians is prioritized.

As described above, according to various embodiments of the present disclosure, the performance and reliability of the algorithm can be optimized by adjusting the operating parameters of the algorithm mounted in the vehicle through pieces of information related to the vehicle driving and the learning information on the basis of the pieces of information.

In particular, the resources used by each algorithm can be saved, the reliability and performance of the algorithm can be efficiently secured in a state in which the resources are saved, and it is possible to respond to various cases, such as when an operation of a specific algorithm is unnecessary, the operation performance of a low-priority algorithm should be increased, or a new algorithm should be added.

In this way, the driving control function of the autonomous driving vehicle can be performed smoothly, and thus driving stability can be secured.

In accordance with various embodiments of the present disclosure, performance and reliability of an algorithm can be optimized by adjusting operating parameters of the algorithm mounted in a vehicle through pieces of information related to vehicle driving and learning results on the basis of the pieces of information.

In particular, resources used by each algorithm can be saved, the reliability and performance of the algorithm can be efficiently secured in a state in which the resources are saved, and it is possible to respond to various cases, such as when an operation of a specific algorithm is unnecessary, operation performance of a low-priority algorithm should be increased, or a new algorithm should be added.

In this way, the driving control function of the autonomous driving vehicle can be performed smoothly, and thus driving stability can be secured.

The effects obtained by the present disclosure are not limited to the above-mentioned effects and other effects which are not mentioned can be clearly understood by those skilled in the art to which the present disclosure pertains from the above description.

As described above, although specific embodiments of the present disclosure has been illustrated and described, those skilled in the art will appreciate that various alternations and modifications are possible without departing from the technical spirit of the present disclosure as disclosed in the appended claims.

What is claimed is:

1. An algorithm operation management apparatus, comprising:
   one or more processors; and
   a memory storing logic commands, when executed by the one or more processors, causing the one or more processors to:
      perform driving control of a vehicle by performing at least one algorithm, wherein performance of the at least one algorithm is determined based on an operating parameter applied to the at least one algorithm;
      learn by classifying an accident situation and a safety situation according to a plurality of driving conditions;
      adjust the operating parameter for the at least one algorithm on the basis of the learning result according to a current driving condition; and
      perform the driving control of the vehicle by performing the at least one algorithm to which the adjusted operating parameter is applied to.

2. The algorithm operation management apparatus of claim 1, wherein, when the learning result corresponds to the accident situation, the one or more processors are configured to adjust the operating parameter to increase or decrease operation performance of at least one algorithm related to the accident situation.

3. The algorithm operation management apparatus of claim 1, wherein the one or more processors are configured to adjust an operating parameter for at least one of the remaining algorithms of the at least one algorithm according to adjustment of an operating parameter for any one of the at least one algorithm.

4. The algorithm operation management apparatus of claim 1, wherein the operating parameter includes at least one among a processor occupation time, an occupied resource, an operating cycle, a processing resolution, a complexity level of the at least one algorithm and an operation priority between the at least one algorithm.

5. The algorithm operation management apparatus of claim 1, wherein the one or more processors are configured to determine the plurality of driving conditions on the basis of vehicle information for a vehicle location, an external environment, an internal environment, and a driving status.

6. The algorithm operation management apparatus of claim 1, wherein the at least one algorithm includes at least one among a driving lane detection algorithm, a surrounding object detection algorithm, a parking line detection algorithm, a surrounding vehicle detection algorithm, and a space detection algorithm.

7. The algorithm operation management apparatus of claim 1, wherein, in a state before the operating parameter for the at least one algorithm is set, the one or more processors are configured to set the operating parameter for the at least one algorithm on the basis of the current driving condition and the learning result.

8. The algorithm operation management apparatus of claim 1, wherein the one or more processors are configured to perform the learning by receiving information corresponding to an accident situation and a safety situation in the same driving condition.

9. The algorithm operation management apparatus of claim 1, wherein the one or more processors are configured to derive a determination result on the basis of a verification result of the learning result.

10. An algorithm operation management method, comprising:

performing driving control of a vehicle by performing at least one algorithm, wherein performance of the at least one algorithm is determined based on an operating parameter applied to the at least one algorithm;

learning, by the one or more processors, by classifying an accident situation and a safety situation according to a plurality of driving conditions;

adjusting, by the one or more processors, the operating parameter for the at least one algorithm on the basis of the learning result according to a current driving condition; and performing, by the one or more processors, the driving control of the vehicle by performing the at least one algorithm to which the adjusted operating parameter is applied to.

\* \* \* \* \*